Figure 3:
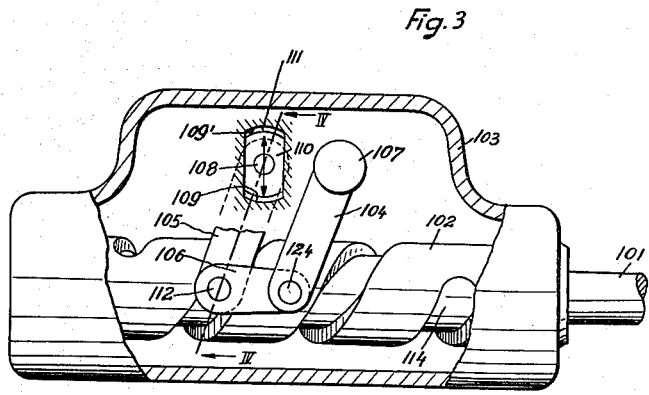

Nov. 29, 1960  HANS-JOACHIM M. FÖRSTER  2,961,886
METHOD FOR SENSING AND AMPLIFYING THE POWER FOR STEERING
VEHICLES AND POWER STEERING MECHANISM
FOR PRACTICING SUCH METHOD
Filed Nov. 21, 1955  2 Sheets-Sheet 1
Fig.1
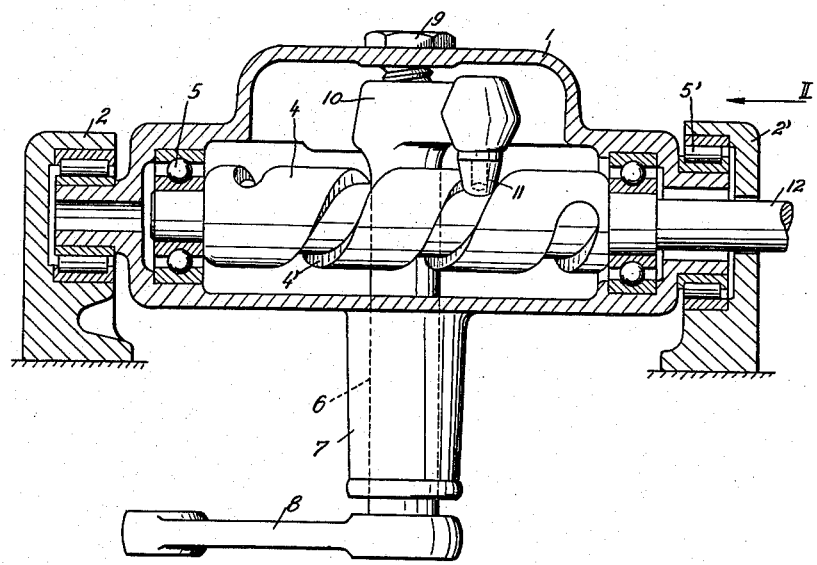
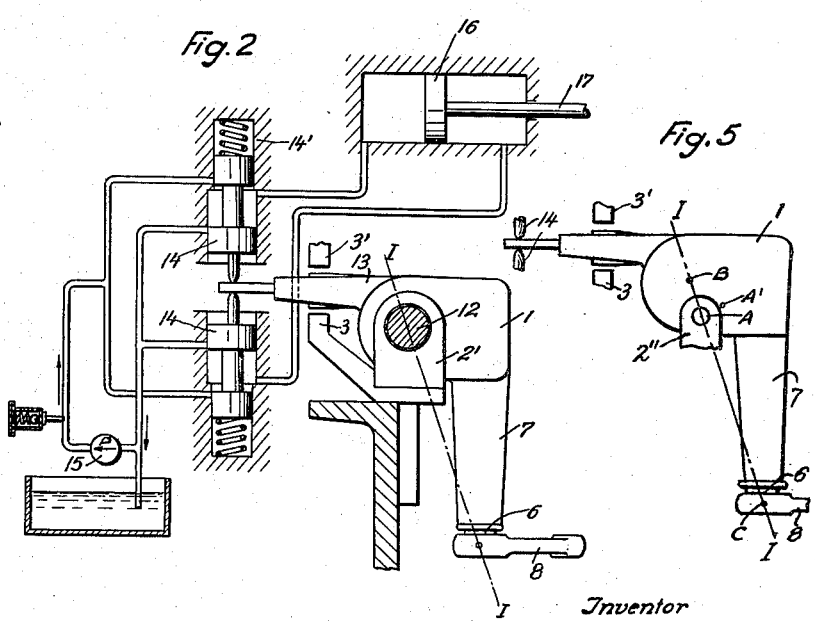
Inventor
HANS-JOACHIM M. FÖRSTER
BY Dicke and Craig
ATTORNEYS United States Patent Office 2,961,886
Patented Nov. 29, 1960

2,961,886

METHOD FOR SENSING AND AMPLIFYING THE POWER FOR STEERING VEHICLES AND POWER STEERING MECHANISM FOR PRACTICING SUCH METHOD

Hans-Joachim M. Förster, Stuttgart-Bad Cannstatt, Germany, assignor to Daimler-Benz Aktiengesellschaft, Stuttgart-Unterturkheim, Germany Filed Nov. 21, 1955, Ser. No. 548,213

Claims priority, application Germany Nov. 19, 1954

25 Claims. (Cl. 74—388)

My invention relates to a method for sensing and amplifying the steering force in power steering mechanisms, for instance in mechanisms involving a worm cooperating with a worm wheel, or a worm cooperating with a follower roller, or a threaded spindle cooperating with a nut mounted thereon for axial motion, one or a plurality of endless rows of balls being disposed within the threads of the spindle. Moreover, my invention relates to a mechanism for practicing such method.

It is known that the steering mechanisms in motor vehicles must be so designed that at any angular position of the wheel a stable balance prevails in that the wheels, when angularly displaced from normal position under steering force, must tend to return to the normal position either by themselves or with the aid of quite a small steering force. In order that the required restoration couples for the angularly displaced wheels may be automatically attained by the straddling and after-running and by the higher ground pressure of the outer wheel resulting in an increased rolling resistance, the physical manual effort required to turn the steering wheel may become quite considerable. In the steering operation the total steering angle of the steering lever, the ratios of transmission existing between the steering wheel and the steering lever and the front wheels, additional ratios of transmission of the steering linkage, the lever arm of the torque produced by the forces effective between the road and the peripheries of the wheels, and the steering wheel diameter influence one another mutually. Moreover, these factors essentially controlling the ease of the steering operation are determined by the design of the entire steering apparatus. There exists a number of additional factors, such as frictional resistances in the transmission, which are difficult to evaluate. Therefore, it is easy to understand the frequently expressed desirability to facilitate the ease of the steering operation beyond the limits determined by the above listed factors, particularly, the ease of operation in parking the vehicle where the steering wheel must be turned while the vehicle is at rest, a particularly high force being required to turn the wheels under such conditions.

A number of power steering mechanisms have been developed for this purpose, such mechanisms including means for sensing the manual effort exerted on the steering wheel and amplifying such force by means of auxiliary power. As a rule, such auxiliary power is not rendered effective until the manual steering force exerted during operation of the vehicle exceeds predetermined limits, the auxiliary power being supplied by a servomotor controlled by the sensing mechanism or transmitter.

The prior power steering mechanisms for motor vehicles are rather complicated and frequently require a modification of the essential elements of the orthodox steering gear, such modifications being frequently inconsistent with such a simplicity of design of the entire steering gear and the power steering mechanism as is conducive to safety of operation and economic manufacture.

It is the object of my invention to provide a power steering mechanism applying and controlling an auxiliary steering force, such mechanism being simple and reliable in operation and requiring no difficult and expensive constructive modification of essential elements of the steering gear and resulting in an excellent ease of the steering operation.

I attain these objects by measuring the manual couple applied by the driver to the steering gear, such measuring being effected by weighing the forces required to support the housing of the steering gear, and by controlling an auxiliary force in proportion to such couple, the auxiliary force aiding and assisting the steering couple. In a mechanism serving to practice this method, the housing of the steering transmission is pivotally mounted on the chassis of the vehicle or on other suitable brackets rigidly connected with the body of the vehicle for pivotal movement about an axis which either coincides with that of the steering column or is parallel to the latter, the supporting force acting on the steering housing during the steering operation and constituting a measure for the required steering power serving to control an auxiliary power which is additionally applied to the steering linkage, for instance to the drag link, such auxiliary power being controlled in proportion to the pivotal displacement of the housing.

The pivotal axis of the housing is preferably disposed between the axis of the steering worm and the point of connection of the drag link with the steering lever, such axis preferably intersecting a line normal to the axis of the steering worm and connecting the same with the steering lever at any desired point thereof.

In event of coincidence of the pivotal axis of the steering gear housing with the axis of the steering worm, the housing will tend to perform a pivotal motion of reduced velocity relative to the rotation of the steering gear. If the axis of the steering housing is positioned at the point of connection of the drag link with the steering lever, then the turning angle of the housing equals the turning angle of the steering gear. Thus, by proper choice of the axis, the ratio of transmission existing between the steering wheel and the member controlling the auxiliary power may be varied, whereby the power steering mechanism may be adapted to the requirements of any particular case, such requirements differing, for instance, in trucks from those existing in passenger cars.

The construction of the novel power steering mechanism may be simplified by rigid connection with the pivotal steering housing of a lever or the like operating through means of reducing or throttling valves to control the steering power supplied by an existing source of pressure fluid, for instance a pressure oil pipe.

Where it is desirable that the ratio of transmission existing between the turning movement of the steering housing and the displacement of the elements (reducing valves or the like) controlling the auxiliary power be invariable irrespective of the position of the housing, I prefer to connect the steering housing by suitable means, such as an arm connected therewith, with a controlling device, for instance a twin slide valve or the like, which governs a double-acting reciprocatory or rotary piston constituting the servomotor which applies the auxiliary power, for instance by means of a piston rod, for the purpose of amplifying the manual effort. A particularly compact arrangement may be attained by designing the steering housing, the controlling device including valves, and the servomotor supplying the auxiliary power as a unit.

Finally, a hydraulic shock absorber provided to absorb shocks originating in the road and acting on the steering mechanism may be constructed as a servomotor producing the desired auxiliary force.

By constructing the power steering mechanism in accordance with my invention, the entire mechanism may be so constructed in a simple and clear manner without substantial modification of essential elements that it will be reliable in operation and will lend itself to economic manufacture. The steering housing as used heretofore may be retained without any substantial modifications of its shape. If desired, it may be combined with the valve housing and/or with the servomotor cylinder in a single block. If the steering housing is retained without modification of its prior shape, the valve unit may be accommodated in a separate housing, no further modifications of the steering mechanism being required. The servomotor piston applying the auxiliary power to the steering linkage may be disposed at any desired point of the train of elements transmitting the steering force.

Numerous steering mechanisms of customary design require a turning of the steering wheel through comparatively large angles to effect a certain angular displacement of the vehicle wheels. This is highly undesirable as it renders the steering operation difficult, particularly when the driver has to take curves of short radius, for instance in turning the vehicle. A simple remedy would be the choice of a smaller ratio of transmission from the steering wheel to the vehicle wheels. This remedy, however, is unsatisfactory because it would render the steering operation in its central range of most frequent use too sensitive in that the vehicle wheels would be angularly displaced an excessive amount by a comparatively small turning angle of the steering wheel. Another remedy would be a progressive reduction of the ratio of transmission as the steering wheel is moved out of its central position or a central range of positions. Such progressive reduction can be effectuated by using a worm of appropriate shape. This remedy, however, is likewise objectionable because the resistance to be overcome by the driver in turning the steering wheel increases progressively to such an extent as to render the steering operation difficult. The opposite arrangement has been proposed in which outside of the central positional range of the steering wheel the ratio of transmission is increased progressively to thereby reduce the physical effort required to turn the steering wheel when approaching its end positions. Clearly, such arrangement, however, is likewise objectionable for the above stated reasons in that it requires an excessive turning angle of the steering wheel.

It is the object of the present invention to provide for a satisfactory remedy. The invention resides substantially in the provision of a ratio of transmission existing between the steering wheel and the vehicle wheels amounting to in the central range of the steering wheel from 14:1 to 16:1, such central range comprising half a turn of the steering wheel from its central normal position in either direction, the ratio of transmission changing progressively outside of said central range in a manner reducing the total turn of the steering wheel in either direction by at least half a turn compared with an invariable ratio corresponding to that of the central range, and by providing a power steering mechanism including means for sensing the steering force at such a point of the steering mechanism at which such force is proportional to the manual force applied to the steering wheel.

Where the steering mechanism includes a worm, the afore-stated progression is preferably embodied by such worm, the lead of the worm in its central range resulting in the customary above-stated ratio of transmission, whereas the end ranges of the worm have a lead resulting in the afore-stated progression, the steering force effective between the steering worm and the steering lever being sensed directly at the worm. The mechanism for sensing and amplifying the manual force applied to the steering wheel preferably includes a roller which engages the steering worm and cooperates with the steering lever through the intermediary of parts of the amplifying mechanism, the roller being capable upon rotation of the steering worm of performing a limited movement at right angles to the worm axis under the effect of the resistance offered to the steering effort by the steering lever still arrested by the vehicle wheels to be steered. During such movement of the roller, which is possible within certain limits, practically no relative displacement will occur between the roller and the worm, and the movement of the roller axis relative to the vehicle body is utilized to control a servomotor for amplifying the steering force.

In a preferred embodiment of the invention, the roller engaging the worm and being guided thereby is connected with the steering lever by a link being at the same time held by a pivotal member in a pivot point preferably positioned substantially at the same level from the worm axis as is the pivotal axis of the steering lever, such pivot point being movable in a direction at right angles to the worm axis between end stops, the movement of the pivot point serving to operate a control element controlling a servomotor in a known manner, the servomotor employing an auxiliary source of power, such as a source of pressure oil, to exert an additional force acting in the sense of the steering movement initiated by the steering wheel. The pivotal member preferably extends parallel to the steering lever and is substantially of the same length as the steering lever, the pivotal member and the steering lever having their outer ends remote from their pivot points connected by means of said link thus constituting a parallelogram linkage.

In connection with the novel power amplifying mechanism I prefer to use a worm which starting from its normal central position has a uniform lead extending over angular ranges of substantially 180° in both directions and in the adjoining end ranges has a progressively increasing lead, the central normal position being the position in which the front wheels of the vehicle are straightened out, and said end ranges extending to the angular end positions of the steering wheel. Preferably, the motion of the pivot point is adapted, by means of a lever preferably rigidly connected to prevent lost motion relative said pivot point, to be transferred to the control element of the servomotor, such lever being pivotal about a pivot point located outside of a slot confined by the above-stated end stops.

My novel power steering mechanism is free from the objections above explained and embodies all of the advantageous features of a power steering mechanism including a worm having a lead which from the transverse central plane of the worm increases considerably towards both ends of the worm. More particularly, the power produced by the servomotor controlled by the pivotal member may be always proportional to the manual force applied to the steering wheel, no matter what ratio of transmission of the worm may be effective at any time.

Figure 4:
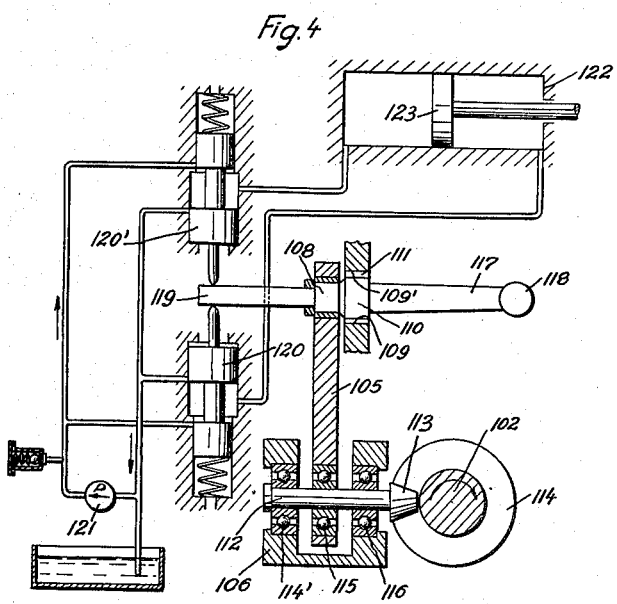

Further objects of my invention will appear from a detailed description of a number of embodiments thereof illustrated in the accompanying drawings, it being understood that such detailed description serves the purpose of illustrating the invention rather than that of restricting or limiting the same. The features of novelty will be pointed out in the claims. In the drawings, Fig. 1 is a longitudinal section taken through the novel steering gear housing provided with the steering shaft, the steering lever and the shaft of the latter, Fig. 2 is a sectional view of the steering gear housing viewed in the direction of the arrow II of Fig. 1, an arm rigidly connected to the housing being adapted to influence controlling means including twin slide valves, the figure further showing a volumetric pump, a double-acting servopiston and associated pressure oil ducts, Fig. 3 illustrates a longitudinal section through the steering gear housing of another embodiment of my invention, Fig. 4 is the section taken along the line IV—IV of Fig. 3, this figure moreover showing the servomechanism controlled by the worm for amplifying the steering forces, the servomechanism being shown diagrammatically, and the parts of the steering mechanism shown in section being slightly modified compared with Fig. 1, and Fig. 5 is a schematic illustration of a modification of the invention generally similar to that illustrated in Figure 2, but with the pivotal axes of the steering worm and the worm housing in the same direction but non-coincidental.

In the embodiment of my novel power steering mechanism for motor vehicles illustrated in Figs. 1 and 2, 1 denotes the steering housing which is rotatably journalled in bearings 5' in brackets 2 and 2'. The brackets 2, 2' are provided with stops 3, 3' limiting the pivotal movement of the steering housing 1. 4 denotes the steering worm which is rotatably journalled in the housing 1 by means of anti-friction bearings 5. 6 denotes the shaft carrying the steering lever, such shaft being journalled in a tubular lug 7 on the housing 1. The end of the shaft projecting out of the lug 7 carries the steering lever 8 rigidly connected thereto. At its upper end the shaft 6 is pivotally supported by the housing 1 and axially adjustable by means of a nut 9 serving the purpose of adjusting the backlash of the shaft 6. A crank 10 integral with the shaft 6 at its other end carries a follower pin or a roller 11, as shown, which cooperates with the sides 4' of the helical groove of the steering worm 4.

The steering worm 4 has a lead which from the normal central position of the worm is of constant customary magnitude extending in both directions over an angular range of approximately 180°, and then as a preferably progressively increasing lead over the end ranges to the limiting end positions of steering wheel movement. In the normal central position of the worm, the dirigible wheels direct the vehicle straight ahead.

In the operation of the mechanism of Figures 1 and 2 for a right turn, for example, the shaft 12 will move clockwise as seen in Figure 2 causing the shaft 6 carrying the steering lever 8 to rotate moving the outer end of the lever 8 away from the reader in Figure 1 and toward the reader in Figure 2.

When the steering worm 4 is rotated by the steering shaft 12, the steering housing 1 will first rock about the axis of the steering shaft and of the steering worm 4, while for the time being no relative movement takes place between the roller 11 and the worm 4. In this manner, the housing 1 is rocked until it engages the end stop 3, or 3' respectively, provided at the brackets 2, 2'. The rocking movement of the steering housing 1 is transferred to slidable control valves of a pressure oil servomechanism, such transfer being effected by means of an arm 13 rigidly connected with the steering housing 1. The servomechanism includes a volumetric pump 15 acting as an auxiliary motor and a double-acting piston 16 of a servomotor. The slidable control valves 14 are movable in a stationary housing 14'.

The movement of the piston rod 17 of the piston 16 is transferred at a suitable point (not shown) to the arms of the hubs carrying the dirigible wheels, such transfer being effected by a suitable linkage. In this manner, an additional couple produced by the servomechanism including the auxiliary motor (volumetric pump 15) and the servopiston 16 is added to the couple applied to the steering wheel. Such additional couple being operative in its turn reacts against the point of connection to the steering linkage to rock shaft 6 of the steering lever 8 to such an extent in the direction of the initiated steering movement until the steering housing 1 jointly with the slide valves 14 will have been rocked back into its normal central position by the slide valves 14 pressed by suitable springs uniformly against the arm 13 from both sides and by the roller 11 pressing against the steering worm 4 which has not been turned any further.

Even in event of an accidental failure of the pressure oil pump a proper functioning of the steering mechanism without amplifying the steering force is ensured. In this event, the additional physical effort to be exerted by the driver for movement of the piston 16 is low, because the control valves 14 controlled by the arm 13 will always permit the oil to flow in the proper direction preventing resistance to piston movement.

In the embodiment illustrated the pivotal axis of the steering housing 1 coincides with the axis of the steering shaft 12. Such coincidence, however, is not a necessary condition of my invention. If desired, the pivotal axis of the housing parallel to shaft 12 may either intersect or may be located adjacent to the line I—I shown in Fig. 2, such line extending between the axis of the steering shaft and the point of connection of the steering lever 8 to its shaft 6. Such alternative construction is schematically illustrated in Fig. 5 in which line I—I is normal to the axis B of the worm shaft 12 and wherein the pivotal axis of the housing in supporting bracket 2" may be directed normal to the plane of the drawing as shown at point A, to intersect line I—I, or at point A', located adjacent to the line I—I, in each instance the pivotal axis of the housing being parallel or extending in the same direction as the pivotal axis B of the steering shaft 12. The point C in Fig. 5 represents the point of connection of the steering lever 8 of the shaft 6, these latter parts being shown in Figs. 1 and 2 of the drawing. In these alternative embodiments, the housing may be pivoted in response to a couple on the shaft 12 to actuate valves 14 in the same manner as described in connection with Fig. 2, is being necessary merely to accommodate the lateral displacement of the steering shaft 12 when the housing pivots about any axis through or near line I—I and not coinciding with the axis of shaft 12. Since the axis B of the worm shaft 12 will move in an arcuate path around, but remaining parallel with respect to, the housing axis at A or A', the couple may be applied to the shaft 12 from a steering wheel (not shown) having a fixed axis by any suitable means such as a flexible torque transmitting coupling (not shown). By so varying the mounting of the housing 1, the ratio of transmission existing between the angular motion of the steering shaft and the angular motion of the steering housing will be varied.

In the embodiment of my invention illustrated in Figs. 3 and 4, the lower end of the steering shaft 101 connected with the steering wheel (not shown) is provided with a steering worm 102 and is rotatably mounted in a steering housing 103. The steering worm 102 has a lead which from the normal central position of the worm is of constant customary magnitude extending in both directions over an angular range of approximately 180°, and then has a preferably progressively increasing lead extending over the end ranges limited by the angular end positions of the steering wheel, said normal central position being the position in which the dirigible vehicle wheels are straightened out.

Within the housing 103 there is furthermore provided a parallelogram linkage comprising a steering lever 104, a pivotal member 105 and a link 106 connecting the elements 104 and 105. The link 106 is positioned laterally of the steering worm 102 extending parallel thereto. The elements 104, 105 extend from the link 106 upwardly in parallel relationship substantially transversely or at right angles to the worm axis. The steering lever 104 is connected in the customary manner with a shaft 107 journalled in the steering housing 103. The pivotal member 105 is pivotally mounted in a pivot point 108 which is movable at right angles to the axis of the steering worm 102. A slidable block 110 serves to guide the pivot point 108, such block being slidably guided in a stationary slot 111 provided with the end stops 109, 109'.

As will appear more particularly from Fig. 4 showing the construction at greater detail, the pivot pin 112 connecting the link 106 with the pivotal member 105 is formed as a roller 113 at its end pointing to the steering worm 102, easy rotation of such roller 113 being ensured by ball bearings 114', 115, 116 by which the pivot pin is journalled in the pivotal member 105 and in the link 106. The roller 113 is slightly conical and engages the groove 114 of the steering worm 102.

As will further appear from Fig. 4, the pivot point 108 forms part of a lever 117 which, at the same time, forms the block 110 and outside of the slot 111 by means not shown is mounted for pivotal movement about a pivot point 118 disposed, for instance, on the steering housing 103. Viewed from its pivot point 118, this lever 117 is extended beyond the pivot point 108 and the free end 119 of its extension acts on a twin control slide 120, 120' of a known servomechanism which comprises a pump 121 for the circulation of the pressure medium, for instance oil, connecting conduits and a servomotor 122 including a double-acting servopiston 123 operable to transfer the auxiliary piston force by suitable customary means (not shown) to such elements of the steering mechanism as are interposed between the shaft 107 and the arms of the hubs carrying the dirigible wheels. The slide valves 120, 120' are resiliently urged in the direction of the slot 111 against the end 119 of lever 117 from the opposite sides thereof tending to restore lever 117 to its central position shown in Fig. 4.

The operation of the power steering mechanism described is as follows:

When the steering shaft 101 is turned from the position shown in Fig. 3 in clockwise direction, the steering lever 104 first resists the desired clockwise swinging motion owing to the friction opposing the steering effect, such opposing friction being essentially exerted by the vehicle wheels. Owing to such resistance, the steering shaft 101 when initially rotated swings pivot pin 112 and the roller 113 upwardly, the roller retaining contact with the original point of the side of worm groove 114. Upward movement of pivot pin 112 causes the link 106 to swing about the pivot pin 124 upwardly. Such swinging movement is limited by engagement of the block 110 with the upper end stop 109' of the slot 111. Owing to the swinging movement of the pivot pin 112 effected jointly with that of the link 106, the free end 119 of the pivotal lever 117 is swung upwardly causing the oil fed under pressure by the pump 121 to flow past the displaced control valve 120' to displace the double-acting piston 123 from its normal central position toward the right as seen in Figure 2, whereas the oil may escape from the other side of the piston 123 and return to the suction side of the pump 121. This causes a force to be exerted upon the elements of the steering linkage (not shown) interposed between the arms of the hubs carrying the dirigible wheels and the steering lever shaft 107, such force being also operative to impart to the steering lever 104 the desired swinging movement in clockwise direction coincidentally to the swinging movement imparted to the vehicle wheels in the sense of the desired steering effect.

If the driver desirous of producing a large angular displacement of the dirigible wheels continues to turn the steering shaft 101, the pivot point 108 of the pivotal member and, therefore, the slidable block 110 will remain in their upper positions and will continue to render the servomotor mechanism effective to produce a force acting in the direction of the initiated steering effect until the driver ceases to turn the steering shaft 101. When that happens, the servomechanism including the piston 123 will initially continue to turn the steering lever 104 causing the latter to urge roller 113 out of engagement with the one side of groove 114 and into engagement with the other side of groove 114 of the worm. Therefore, no upward force will be exerted on pivotal member 105 any longer thus permitting the control slide valves 120, 120' pressing resiliently against the free end 119 of lever 117 from the opposite sides thereof to restore the pivotal member 105 downwardly into the central position shown in Fig. 3. This restoring force is enhanced by engagement of the roller 113 with the inclined opposite side of groove 114, such inclined side exerting a pressure on the roller 113 having a downwardly directed component. When lever 117 has been restored to its normal position shown in Fig. 4, the valves 120, 120' will cut off the conduits leading to cylinder 122 thus discontinuing the production of a servoforce. Now, steering lever 104 and the dirigible vehicle wheels will remain in their position reached until the steering shaft 101 is turned again in one or the other direction.

The limitation of the movement of pivot point 108 in the slot 111 by the end stops 109, 109' ensures that in event of a failure of the servomechanism or in event of full displacement of lever 117 to one of its end positions the manual steering will not be interfered with. Under such conditions the means provided for the purpose of the present invention do not materially increase the physical effort required to steer the vehicle in the normal steering range so that the safety of operation of the vehicle will not be adversely affected in any way.

The use of the invention is not limited to the examples illustrated in the accompanying drawings. The construction of the individual transferring and controlling means or of the servomotor mechanism is capable of numerous modifications without departing from the invention. Thus, for instance the pivot point 108 need not be guided by means of a slidable block, but may be the end point of another lever which has its other end pivotally mounted for swinging movement within predetermined limits, such lever extending at right angles to the arrow shown in Fig. 3 near the pivot point 108. Also, one or more reducing valves, throttling valves or the like may be used in a known manner in lieu of the control valves for controlling the servomechanism.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Power steering mechanism comprising a steering shaft, a threaded element connected thereto, a housing surrounding said threaded element, a steering lever pivotally mounted in said housing, means carried by said steering lever and engaging said threaded element for actuation thereby, means for journalling said housing for pivotal movement, controlling means operable by said housing and responsive to rotary displacements thereof, and a servomotor cooperatively connected with said steering lever and adapted to be controlled by said controlling means.

2. The mechanism as claimed in claim 1 in which the axis of said means for journalling said housing coincides with the axis of said threaded element.

3. The mechanism as claimed in claim 1 in which the axis of said means for journalling said housing extends in the same direction as the axis of said threaded element and is adjacent to a line extending through the axis of said threaded element perpendicular thereto and through the pivotal end of said steering lever.

4. Power steering mechanism comprising a steering shaft, a threaded element connected thereto, a housing surrounding said threaded element, a shaft journalled in said housing and extending transversely to said threaded element, a steering lever connected to said shaft, means carried by said shaft and engaging said threaded element for actuation thereby, means for journalling said housing for pivotal movement about an axis extending in the same direction as the axis of said threaded element and intersecting a line extending through the axis of said threaded element at right angles thereto and through the point of connection of said second-mentioned shaft with said steering lever, controlling means operable by said housing and responsive to rotary displacements thereof, and a servomotor cooperatively connected with said steering lever and adapted to be controlled by said controlling means.

5. The mechanism as claimed in claim 1 further comprising an arm rigidly connected to said housing, a source of fluid under pressure, and conduits, said controlling means including valves operable by said arm and adapted to control a fluid under pressure supplied by said source, said servomotor being of the type operable by said fluid, said conduits connecting said valves to said servomotor and to said source.

6. The mechanism as claimed in claim 5 in which said servomotor includes a reciprocating piston cooperatively connected with said steering lever.

7. The mechanism as claimed in claim 5 in which said valve comprises a stationary housing and twin valve elements slidably mounted therein for actuation by said arm.

8. The mechanism as claimed in claim 1 in which said controlling means comprises a movable casing mounted for common movement with said housing surrounding said threaded element, and a stationary valve member slidably engaging said casing.

9. The mechanism as claimed in claim 1 in which said housing, said controlling means and said servomotor constitute a unit.

10. The mechanism as claimed in claim 1 wherein for steering the dirigible wheels of a vehicle said servomotor is formed by a shock absorber connected to a steering linkage to absorb shocks exerted on said linkage by said wheels.

11. Power steering mechanism comprising a steering shaft and a train of motion-transmitting elements connected to said steering shaft and to the steering lever which steer the wheels of a vehicle, said train of motion-transmitting elements having a substantially constant ratio of transmission within a central range of operation, said central range comprising substantially half a rotation of said steering shaft counted from the central normal position of the latter, said constant ratio of transmission being selected from the range 14:1 to 16:1, said train of motion-transmitting elements further having a progressively varying ratio of transmission in the end ranges of operation adjoining said central range causing the total rotation of the steering shaft required to effect a maximum angular displacement of the wheels to be reduced by at least half a rotation in either direction, means for measuring the force exerted on said steering shaft, said means cooperating with a member included in said train, and a servomotor controlled by said means and connected with said train at a point between said wheels and said member.

12. The mechanism as claimed in claim 11 in which said member is a steering worm, said train further including a steering lever coordinated to said worm and adapted to be rocked thereby, said means for measuring said force cooperating directly with said worm to measure the force exerted by said worm on said steering lever.

13. The mechanism as claimed in claim 12 further comprising a roller connected with said steering lever and engaging said worm, means mounting said roller for displacement transversely to said worm, controlling means connected to said roller and responsive to said transverse displacement and adapted to control said servomotor, and stops for limiting said transverse displacement.

14. Power steering mechanism for vehicle wheels comprising a worm operable by a steering means, a linkage coordinated to said worm to be actuated thereby and connected to said wheels, said linkage including a shaft extending transversely to said worm and a steering lever fixed to said shaft, a roller engaging said worm, a link extending lengthwise of said worm and connecting said roller to the end of said lever to thereby guide said roller for displacement transversely to said worm, an arm mounted for pivotal movement in a direction transversely to said worm and to said link, means for guiding said arm in said direction, a pivotal member connecting said arm with said roller and adapted to transmit said displacement to said arm, servomotor means connected to said linkage, and controlling means adapted to control said servomotor means and coordinated to said arm to be operable thereby.

15. The mechanism as claimed in claim 14 in which said pivotal member extends substantially parallel to said steering lever and is of substantially equal length therewith, and in which said link extends substantially parallel to a line connecting said shaft to said arm.

16. The mechanism as claimed in claim 14 in which said means for guiding said arm in said direction comprises a block and stationary guideways for such block, said mechanism further comprising stops limiting the pivotal movement of said arm and associated with said guideways.

17. The mechanism as claimed in claim 14 further comprising a source of pressure fluid and conduits, said servomotor being of the fluid operable type, said controlling means comprising a valve connected by said conduits to said source and to said servomotor.

18. A power steering mechanism comprising steering means including a steering shaft and a housing means, a worm driven by said steering shaft, said worm being journalled in said housing means, mechanical means connecting said housing means and said worm, said mechanical means having a follower driven by said worm which transmits movement to said housing means, power means including valve means having sensing means to transmit said movement of said housing means to said power means for causing corresponding actuation of said power means.

19. A power steering mechanism comprising a steering shaft, a worm, a torque responsive parallelogram linkage, housing means, movable control means adjacent said housing, power cylinder means including a servo motor having a double acting servo piston, twin slide valve means, a fluid pump, a reservoir and conduit means operatively interconnecting said reservoir, said pump, and said twin slide valves with said servo motor, said parallelogram linkage being operatively connected to said worm, said control means and said housing means to transmit torque from said worm through said torque responsive parallelogram linkage to said control means for actuating one of said twin slide valve means and thereby causing a corresponding actuation of said double acting servo piston.

20. A power steering mechanism as set forth in claim 19, wherein said movable control means includes a lever pivotally connected at one end to said housing and connected to said parallelogram linkage in closely spaced relationship thereto, and the other end of said lever is free to actuate either of said twin slide valve means depending upon the direction of movement of said other end of said lever.

21. A power steering mechanism as set forth in claim 20, wherein said parallelogram linkage comprises a link having a pivot pin pivotally connected to one end of said link and a steering lever journal in the other end of said link, said steering lever being pivotally connected to said housing means, said pivot pin including a roller on one end adapted to be guided within the grooves of said worm, and a pivotal member pivotally connected to said pivot pin at one end thereof and to said lever at the other end thereof.

22. Power steering mechanism for sensing and amplifying the steering force applied to a steering shaft, comprising a threaded element rotatably driven by said shaft and mounted for rotation about an axis, follower means engaging the threads of said element and driven thereby for transmitting said steering force to a steerable means, means for mounting said follower means for movement generally along said axis in response to rotation of said shaft to transmit said steering force, said mounting means also guiding said follower means for movement transversely of said axis, the threads of said element actuating said follower means transversely of said axis in response to the application of a couple to said shaft, and control means including an auxiliary power source and means responsive to transverse movement of said follower means relative said axis for controlling said auxiliary power source to supplement the action of said couple on said steerable means from said auxiliary power source.

23. A power steering mechanism according to claim 22 wherein said threaded element is a steering worm having a predetermined pitch at a central portion of its active length and gradually increasing pitch in both directions of its length beyond said central portion.

24. A power steering mechanism according to claim 22, including a housing within which said threaded element is mounted for rotation and wherein the mounting means for said follower means includes a member operatively connected to said control means and supporting said follower means in engagement with said threaded element, said member being pivotally supported for rotation about a second axis in said housing and rotatable about said second axis in response to rotation of said threaded element.

25. A power steering mechanism according to claim 24, wherein said second axis extends generally transversely with respect to the rotational axis of said threaded element.

References Cited in the file of this patent

UNITED STATES PATENTS

| | | |
|---|---|---|
| 1,947,991 | Jessup | Feb. 20, 1934 |
| 2,508,057 | Bishop | May 18, 1950 |
| 2,627,187 | Davis | Feb. 3, 1953 |

FOREIGN PATENTS

| | | |
|---|---|---|
| 191,994 | Switzerland | Oct. 1, 1937 |
| 234,584 | Great Britain | June 4, 1925 |
| 960,179 | France | Jan. 26, 1948 |